United States Patent

[11] 3,634,062

[72] Inventors Dagmar Berrer
 Riehen;
 Ernst Fankhauser, Muttenz, both of
 Switzerland
[21] Appl. No. 726,233
[22] Filed May 2, 1968
[45] Patented Jan. 11, 1972
[73] Assignee J. R. Geigy AG
 Basel, Switzerland
[32] Priority Nov. 26, 1965
[33] Switzerland
[31] 16345/65
 Continuation-in-part of application Ser. No.
 595,370, Nov. 18, 1966, now abandoned.
 This application May 2, 1968, Ser. No.
 726,233

[54] PROCESS FOR CONTROLLING WEEDS IN WHEAT FIELDS
 8 Claims, No Drawings

[52] U.S. Cl. .................................................. 71/93,
 260/249.8

[51] Int. Cl. ........................................................ A01n 9/22
[50] Field of Search ............................................ 71/93

[56] References Cited
 UNITED STATES PATENTS

| | | | |
|---|---|---|---|
| 3,492,110 | 1/1970 | Hood et al. ................ | 71/93 |
| 2,909,420 | 10/1959 | Gysin et al. ................ | 71/93 |
| 3,145,208 | 8/1964 | Knusli et al. ................ | 71/93 X |
| 3,207,756 | 9/1965 | Knusli et al. ................ | 71/93 X |

FOREIGN PATENTS

| | | | |
|---|---|---|---|
| 1,372,089 | 8/1964 | France ................ | 71/93 |

Primary Examiner—James O. Thomas, Jr.
Attorney—Wenderoth, Lind & Ponack

ABSTRACT: Pre-emergence control of grass-type and broad-leaved weeds in grain fields with the aid of novel 2-methylthio-4-ethylamino-6-t-butylamino- and -6-isobutylamino-s-triazines is described as well as compositions containing these two s-triazine derivatives for such control.

PROCESS FOR CONTROLLING WEEDS IN WHEAT FIELDS

This application is a continuation-in-part of our pending patent application Ser. No. 595,370 filed Nov. 18, 1966, now abandoned.

DETAILED DISCLOSURE

The present invention concerns processes and compositions for the control of weeds in grain fields using certain s-triazine derivatives.

In recent years a series of herbicidal active substances from the group of the s-triazines have become known for the control of weeds in various plant cultivations, but none of these triazines is the ideal weed killer in grain fields such as wheat, rye, oats, barley, etc. Tests have shown that although the weeds can be completely eliminated by such triazines, the cereals are damaged under the conditions necessary for their application. Generally such s-triazine active substances are applied to the field after emergence of the cultivated plants. Of all the previously known herbicides from the most varied classes of substances, there is still no active substance known which can be used in grain fields before emergence of the plants for general, all-embracing weed control. It is true that some carbamates are recommended as so-called preemergence herbicides, but they have only a specific action on grass-type weeds. Thus, such active substances can only be used to a limited extent as herbicides in grain fields.

The preferred application of herbicides before emergence of the cultivated plants has great economic and technical advantages over the hitherto used, postemergence application. The active substance is applied immediately after sowing of the cultivated plants; in this way the weeds are killed even in the germination stage. There is thus unhindered growth of the cultivated plants which leads to a considerable increase in the harvest. With this type of application, no damage of any kind is caused to the developing cultivated plants by the treatment. However, in preemergence treatments, very serious damage is done the wheat or barley by such well-known selective 2-methylthio-s-triazine herbicides as Prometryne.

There is thus an urgent demand for a herbicidally active substance which can be applied in cereal cultivation before emergence of the plants and which possesses a range of action as wide as possible.

Surprisingly, it has now been found that 2-methylthio-4-ethylamino-6-t-butylamino-s-triazine and 2-methylthio-4-ethylamino-6-isobutylamino-s-triazine, due to their being better tolerated by cereals, are suitable for the control of grass-type and broad-leaved weeds in grain fields before emergence of the plants. The weeds in spring-sown cereals, also however, under suitable climatic conditions, those in winter-sown cereals, are killed with these herbicides. 2-methylthio-4-ethylamino-6-t-butylamino-s-triazine and -6-isobutylamino-s-triazine are the sole herbicides from the triazine group, which are tolerated by all types of cereals such as wheat, rye, barley, oats, etc. in high concentration and which can be applied to cereals before their emergence.

To determine the tolerance, plots in fields were sown with wheat and barley and then treated with:

I.     2-methylthio-4,6-bis-isopropylamino-s-triazine (Prometryne), and
II.     2-methylthio-4-ethylamino-6-t-butylamino-s-triazine (according to the invention), in the concentrations given below. Growth of the plants was evaluated after 53 days as follows:

10 = normal growth
9–1 = degree of inhibition of growth
0 = growth

| substance | wheat concentration in kg. of ingredient per ha. | | barley | |
|---|---|---|---|---|
| | 1.12 | 2.24 | 1.12 | 2.24 |
| I | 3 | 0–1 | 2–3 | 0–1 |
| II | 9–10 | 6 | 9–10 | 5–6 |

2-methylthio-4-ethylamino-6-t-butylamino-s-triazine and 2-methylthio-4-ethylamino-6-isobutylamino-s-triazine—depending on the type of soil—are used in concentrations of 0.50 to 4.5 kg. active substance per hectare. Preferred dosages are between 1.00 and 3 kg. of active substance per hectare.

The preemergence compositions usable according to the invention and containing 2-methylthio-4-ethylamino-6-t-butylamino-s-triazine or -6-isobutylamino-s-triazine as active ingredient can also comprise additives usual in weed killers such as carriers and distributing agents. The content of active substance in the compositions according to the invention varies within the range of 1 and 90 parts by weight of 2-methyl-thio-4-ethylamino-6-t-butylamino-s-triazine or -6-isobutylamino-s-triazine.

The compositions according to the invention can be in the form of and applied as solutions, dusts, sprinkling agents, particularly however, in the form of solutions which can be emulsified in water or powders which can be dispersed in water. A fine distribution of the active substances must be attained on application.

Dusts and sprinkling agents, which latter also embraces granulates, can be produced by mixing or milling the active substance with the usual solid carriers. Examples of such are: talcum, diatomaceous earth, kaolin, bentonite, calcium carbonate, tricalcium phosphate, sand, and also sawdust, ground cork and other materials of vegetable origin. The substance can also be brought onto the carriers by means of a volatile solvent.

Wettable powders are obtained by mixing and milling together the active substance with solid carriers such as chalk, kaolin, highly dispersed silicic acid and silicates, and also with the necessary amounts of wetting and dispersing agents, to a particle size of 0.05 to 40 microns.

Also, emulsifiable solutions serve for the production of aqueous application forms, e.g., solutions of the active substance in higher boiling organic solvents such as xylene, into which, if desired, suitable solubility promoters and-or suitable emulsifying agents are admixed.

In a similar way, liquid or pastelike concentrates can be produced by mixing the active substance with dispersing agents, organic solvents and, optionally, pulverized solid carriers, in suitable apparatus until homogeneity is attained. These concentrates are then diluted with water before use.

Suitable emulsifying and dispersing agents are, e.g., anion active alkali metal salts of sulfuric acid monoesters of long chain aliphatic alcohols, or aliphatic-aromatic sulfonic acids or of long chain alkoxyacetic acids, and nonionogenic emulsifying and dispersing agents from the classes of polyethylene glycol ethers of fatty alcohols or alkyl phenols, higher polycondensation products of ethylene oxide, and aliphatic-aromatic polyglycol ethers, as well as mixtures thereof with anion active emulsifying agents.

All agents according to the invention can also contain additives to increase the stability to rain and light as required. In addition they can also contain additives which facilitate the adhesion and, thus, the penetration into the substrate, e.g., animal, vegetable, and mineral oils.

The following examples illustrate the production of some typical forms for application of the agents according to the invention. Parts are given therein as parts by weight.

EXAMPLE 1

The following components are used to produce 50 percent wettable powders:

a. 50 parts of 2-methylthio-4-ethylamino-6-t-butylamino-s-triazine,
5 parts of hexadecyl glycol ether-sulfate sodium salt,
5 parts of calcium-lignin sulfonate,
20 parts of kieselguhr,
20 parts of kaolin.
b. 50 parts of 2-methylthio-4-ethylamino-6-t-butylamino-s-triazine, 5 parts of sodium dibutyl naphthalene sulfonate,
5 parts of the ammonium salt of a formaldehyde condensation product of naphthalene sulfonic acid and phenol,
10 parts of kieselguhr,
30 parts of kaolin.

The active substance is mixed with the carriers and additives and the mixture is finely milled on suitable rollers and mills. Diluted with water, the 50 percent wettable powders obtained produce very stable suspensions which are excellently suitable for the preemergence treatment of spring-sown cereals.

Similar wettable powders are obtained by replacing 2-methylthio-4-ethylamino-6-t-butylamino-s-triazine in example 1 (a) and (b), by the same amounts of 2-methylthio-4-ethylamino-6-isobutyl-amino-s-triazine.

EXAMPLE 2

The following substances are used to produce a 25 percent emulsion concentrate:

26 parts of 2-methylthio-4-ethylamino-6-t-butylamino-s-triazine 5 parts of an emulsifier consisting of a combination of the Ca salt of dodecylbenzene sulfonate and nonylphenol eicosaglycol ether, 70 parts of xylene.

The active substance is dissolved in xylene and the emulsifier is then added to this solution. Emulsions can be produced from this concentrate by dilution with water. They are particularly suitable for the control of weeds in spring-sown cereals before emergence.

A similar emulsion concentrate is obtained by replacing the 6-t-butylamino-s-triazine in above example by the same amount of 2-methylthio-4-ethylamino-6-isobutylamino-s-triazine.

The following example describes the application of the active substance for the control of grass-type and broad-leaved weeds before emergence of spring-sown cereals:

EXAMPLE 3

Spring-sown wheat "Svenno," was treated before emergence with

I.     2-methylthio-4,6-bis-isopropylamino-s-triazine (Prometryne),

II.     2-methylthio-4-ethylamino-6-t-butylamino-s-triazine, and

III. 2-methylthio-4-ethylamino-6-isobutylamino-s-triazine.

For this purpose, plots of land in which chiefly Chenopodium, *Polygonum persicaria, Polygonum convulvolus* were growing as weeds, were prepared for sowing with a rotary hoe. The seeds were sown at a depth of 2 to 3 cm. One day after sowing, the plots were treated with the active substances, sprayed as a suspension, which was produced by diluting 50 percent wettable powders obtained according to example 1 with water. The test was evaluated 15 days after treatment according to the scale given below:

| Concentration in kg. of active ingredient per hectare | Spring sown wheat | | | | Weed | | | |
|---|---|---|---|---|---|---|---|---|
| | 1 | 1.5 | 2 | 3 | 1 | 1.5 | 2 | 3 |
| Substance: | | | | | | | | |
| I | 6 | 3-4 | 3 | 2 | 0-1 | 0-1 | 0-1 | 0 |
| II | 10 | 10 | 9 | 8 | 0-1 | 0-1 | 0-1 | 0-1 |
| III | 8.75 | 7.5 | | | 0-1 | 0-1 | | |

NOTE.—10=normal growth. 9-1=degree of inhibition of growth. 0=no growth.

The novel s-triazines mentioned hereinbefore, which represent another aspect of the invention, are of the formulas

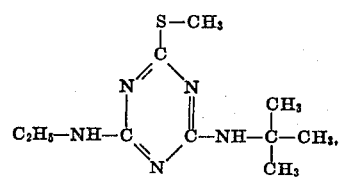

2-methylthio-4-ethylamino-6-t-butylamino-s-triazine and

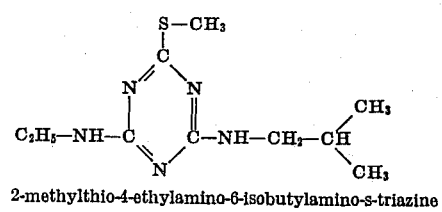

2-methylthio-4-ethylamino-6-isobutylamino-s-triazine and are produced by the procedure described in U.S. Pat. No. 3,207,756 to Knusli et al. issued Sept. 21, 1965.

They are useful as highly selective herbicides in the control of weeds in grain fields as has been described hereinbefore, and also as antioxidant adjuvants in lubricants and functional fluids and as stabilizers especially for nitro lacquers against deterioration of the latter under the effects of heat and light.

We claim:

1. A process for controlling grass-type and broad-leaved weeds in cereals, which comprises treating grain fields before emergence with a compound selected from 2-methylthio-4-ethylamino-6-t-butylamino-s-triazine and 2-methylthio-4-ethylamino-6-isobutylamino-s-triazine in an amount sufficient to control said weeds, but not harmful to subsequently emerging grain seedlings.

2. A process as described in claim 1, which comprises treating said wheat fields with 0.50 to 4.5 kg. per hectare of 2-methylthio-4-ethylamino-6-t-butylamino-s-triazine.

3. A process as described in claim 1, which comprises treating the grain fields with 0.50 to 4.5 kg. per hectare of 2-methylthio-4-ethylamino-6-isobutylamino-s-triazine.

4. A herbicidal composition for controlling grass-type and broad-leaved weeds in grain fields, consisting essentially of compound selected from 2-methylthio-4-ethylamino-6-t-butylamino-s-triazine and 2-methylthio-4-ethylamino-6-isobutylamino-s-triazine, in an amount sufficient to control said weeds, and additive acceptable for weed control.

5. A herbicidal composition as described in claim 4, which contains from about 1 to about 90 parts by weight of 2-methylthio-4-ethylamino-6-t-butylamino-s-triazine.

6. A herbicidal composition as described in claim 4, which contains from about 1 to about 90 parts by weight of 2-methylthio-4-ethylamino-6-isobutylamino-s-triazine.

7. 2-Methylthio-4-ethylamino-6-t-butylamino-s-triazine.

8. 2-Methylthio-4-ethylamino-6-isobutylamino-s-triazine.

* * * * *

UNITED STATES PATENT OFFICE
CERTIFICATE OF CORRECTION

Patent No. 3,634,062            Dated  January 11, 1972

Inventor(s)  Dagmar Berrer et al.

It is certified that error appears in the above-identified patent and that said Letters Patent are hereby corrected as shown below:

In the Claims:

Cancel claims 3 to 8.

Claim 1, line 3, cancel "a compound selected from"; claim 1, line 5 has been deleted in its entirety; claim 1, line 2, "grain" and "cereals" have been change to -- wheat --; claim 1, line 7, "grain" has been changed to -- wheat --.

Signed and sealed this 3rd day of April 1973.

(SEAL)
Attest:

EDWARD M. FLETCHER, JR.                ROBERT GOTTSCHALK
Attesting Officer                       Commissioner of Patents

UNITED STATES PATENT OFFICE
CERTIFICATE OF CORRECTION

Patent No. 3,634,062          Dated January 11, 1972

Inventor(s) Dagmar Berrer et al.

It is certified that error appears in the above-identified patent and that said Letters Patent are hereby corrected as shown below:

Claim 1 should read:

1. A process for controlling grass-type and broad-leaved weeds in wheat, which comprises treating wheat fields before emergence with 2-methylthio-4-ethylamino-6-t-butylamino-s-triazine in an amount sufficient to control said weeds, but not harmful to subsequently emerging wheat seedlings.

Signed and Sealed this twenty-fourth Day of February 1976

[SEAL]

Attest:

RUTH C. MASON
Attesting Officer

C. MARSHALL DANN
Commissioner of Patents and Trademarks